(12) United States Patent
Hankey et al.

(10) Patent No.: US 8,069,112 B2
(45) Date of Patent: Nov. 29, 2011

(54) SYSTEMS AND METHODS FOR OPTIMIZATION OF A FINANCIAL TRANSACTION

(75) Inventors: Don Rufus Hankey, Los Angeles, CA (US); Amarpal Singh, Los Angeles, CA (US)

(73) Assignee: Nowcom Corporation, Los Angeles, CA (US)

( * ) Notice: Subject to any disclaimer, the term of this patent is extended or adjusted under 35 U.S.C. 154(b) by 28 days.

(21) Appl. No.: 11/627,846

(22) Filed: Jan. 26, 2007

(65) Prior Publication Data

US 2008/0183616 A1 Jul. 31, 2008

(51) Int. Cl.
*G06Q 40/00* (2006.01)
(52) U.S. Cl. ............................................ 705/38; 705/35
(58) Field of Classification Search ..................... 705/38, 705/35
See application file for complete search history.

(56) References Cited

U.S. PATENT DOCUMENTS

| | | | | |
|---|---|---|---|---|
| 5,774,883 | A * | 6/1998 | Andersen et al. | 705/38 |
| 6,950,807 | B2 | 9/2005 | Brock | |
| 7,401,037 | B2 * | 7/2008 | Arena et al. | 705/35 |
| 2002/0123961 | A1 * | 9/2002 | Stoyanov et al. | 705/38 |
| 2002/0152157 | A1 * | 10/2002 | Stoyanov et al. | 705/38 |
| 2002/0194120 | A1 | 12/2002 | Russell et al. | |
| 2003/0041019 | A1 | 2/2003 | Vagim et al. | |
| 2005/0044026 | A1 | 2/2005 | Leistner | |
| 2006/0155638 | A1 | 7/2006 | De La Motte | |
| 2006/0229981 | A1 * | 10/2006 | Crites | 705/40 |
| 2007/0276749 | A1 | 11/2007 | Vagim et al. | |

OTHER PUBLICATIONS

Jim Mateja. (Apr. 27). Prospective Car Buyers Should Get Educated about Purchase. Knight Ridder Tribune Business News,1. Retrieved Sep. 13, 2011, from Business Dateline.*
Do your homework on hire-purchase. (Dec. 11, 2005). Sunday Business Post, Retrieved Sep. 13, 2011, from ProQuest Newsstand.*

* cited by examiner

*Primary Examiner* — Narayanswamy Subramanian
*Assistant Examiner* — Kito R Robinson
(74) *Attorney, Agent, or Firm* — Acuity Law Group; Daniel M. Chambers

(57) ABSTRACT

A method of determining a structure for financing a consumer product through a computer implemented process according to one embodiment comprising the steps of: receiving one or more fixed inputs including a monthly payment value and a down payment value; calculating a plurality of potential financial structures for the consumer product based upon the monthly payment value and the down payment value; and determining from the plurality of potential financial structures, a financial structure that provides a greatest profit for a seller of the consumer product.

15 Claims, 10 Drawing Sheets

Dealer Desktop

File  View  Tool  Help

Print Deal | Calculate | Save Deal | ☆ MvpTM ▼ | Share the Deal

Buy Program Structure

Deal Information

Deal Structure

| | | | | |
|---|---|---|---|---|
| Price: | $6,427.25 | Payments: | 31 | $200.00 |
| Trade Allowance: | $0.00 | Date 1st Payment: | 30 | 02/11/07 |
| Trade Payoff: | $0.00 | | | |
| Cash Down: | $2,000.00 | Doc: | | $0.00 |
| Srv Contract: | $0.00 | | | |
| Title: | $112.00 | Sales Tax: | 0.000% | $0.00 |
| Ins.: | N | MAX OK TO FIN: | | $5,004.66 |
| Gap: | N | Amount Financed: | | $4,539.25 |

Vehicle/Contract Information

| | | | | |
|---|---|---|---|---|
| Vehicle: | Ford, Focus | | | |
| Model Year: | 2000 | Mileage: | | 70388 |
| NADA: | $3,475.00 | Class: | | 2 |
| Cost: | $3,400.00 | Car Type: | | B |
| War Cost: | $0.00 | Loan Date: | | 01/12/07 |
| Buy Rate: | 24.90% | Finance Charge: | | $1,660.75 |

Calculation Results

| | | | |
|---|---|---|---|
| Cust. Factor: | 1.12 | Discount: | $1,425.00 |
| Dealer Gross: | $1,502.25 | Acquisition Fee: | $100.00 |
| Net Check to Dealer: | $3,014.25 | Potential Reserve: | $0.00 |

Deal Approval

| | |
|---|---|
| Structure OK: | YES |
| Amount Financed: | YES |

| Dealer Desktop | | | | |
|---|---|---|---|---|
| File View Tool Help | | | | |
| Print Deal | Calculate | Save Deal | ☆ MVP™ ▼ | Share the Deal |

312

Buy Program Structure

Deal Information

Deal Structure

| | | | | |
|---|---|---|---|---|
| Price: | $7,122.73 | Payments: | 26 | $250.00 |
| Trade Allowance: | $0.00 | Date 1st Payment: | 30 | 02/11/07 ▼ |
| Trade Payoff: | $0.00 | Doc: | | $0.00 |
| Cash Down: | $2,250.00 | Sales Tax: | 0.000% | $0.00 |
| Srv Contract: | $0.00 | MAX OK TO FIN: | | $5,004.66 |
| Title: | $112.00 | Amount Financed: | | $4,984.73 |
| Ins.: | N ▼ | $0.00 | | |
| Gap: | N ▼ | $0.00 | | |

Vehicle/Contract Information

| | | | |
|---|---|---|---|
| Vehicle: | Ford, Focus | | ▼ |
| Model Year: | 2000 | Mileage: | 70388 |
| NADA: | $3,475.00 | Class: | 2 |
| Cost: | $3,400.00 | Car Type: | B ▼ |
| War Cost: | $0.00 | Loan Date: | 01/12/07 ▼ |
| Buy Rate: | 24.90% | Finance Charge: | $1,515.27 |

Calculation Results

| | | | | |
|---|---|---|---|---|
| Cust. Factor: | 1.16 | Discount: | $1,560.00 | |
| Dealer Gross: | $2,062.73 | Acquisition Fee: | $100.00 | |
| Net Check to Dealer: | $3,324.73 | Potential Reserve: | $0.00 | |

Deal Approval

| | |
|---|---|
| Structure OK: | YES |
| Amount Financed: | YES |

SYSTEMS AND METHODS FOR OPTIMIZATION OF A FINANCIAL TRANSACTION

BACKGROUND OF THE INVENTION

1. Field of the Invention

The present invention relates to automated credit approval systems and methods. More specifically, the present invention relates to automated credit approval systems and methods used when conducting a financial transaction for a vehicle.

2. Discussion of the Related Art

In the used car industry, there are many people with sub-prime credit who are looking to purchase a vehicle. In general, people with bad credit are simply looking to buy any reasonably drive-worthy vehicle that the dealer is willing to sell to them and for which they are able to obtain financing provided the financing company agrees to the down payment amount and the monthly payment amount they can afford. Historically, in order for a person with bad credit to receive approval on financing, a lender would need to review the person's loan application and make a determination as to whether financing would be approved or rejected. In many instances, this process could three or four days, thus preventing a deal from being made on the spot. Anytime, the person leaves the car lot without the deal being completed there is a greater chance that the person will walk away without purchasing the vehicle.

Thus, more recently, automated loan approval systems have become available. For example, one such system in described in U.S. patent application Ser. No. 10/043,676, filed Jan. 9, 2002, entitled METHODS AND SYSTEMS FOR DEAL STRUCTURING FOR AUTOMOBILE DEALERS, which application is incorporated herein by reference in its entirety. Another such automated approval system is described in U.S. Pat. No. 6,950,807, issued Sep. 27, 2005, entitled SYSTEM AND METHOD FOR PROVIDING FINANCING, which patent is incorporated herein by reference in its entirety.

While these automated approval systems have greatly enhanced the ability of a dealer to close a deal the same day that the person walk onto the lot, there are improvements upon these systems that can be made to aid a dealer in putting together the best deal possible.

SUMMARY

The embodiments described herein provide systems and methods for providing a seller of a consumer product with the greatest profit when structuring a loan for a financial transaction within the constraints of the down payment amount and the monthly payment amount a consumer can afford.

One embodiment can be characterized as a method of determining a structure for financing a consumer product through a computer implemented process comprising the steps of: receiving one or more inputs including a monthly payment value and a down payment value; calculating a plurality of potential financial structures for the consumer product based upon the monthly payment value and the down payment value; and determining from the plurality of potential financial structures, a financial structure that provides a greatest profit for a seller of the consumer product. Optionally, the embodiment can further include the steps of: selecting the financial structure that provides the greatest profit for the seller of the consumer product; and outputting to a display device an indication of the financial structure that provides the greatest profit for the seller of the consumer product. Alternatively, some embodiments can further include the steps of: calculating a plurality of potential financial structures for each of a plurality of consumer products based upon the monthly payment value and the down payment value; and determining from the plurality of potential financial structures, a financial structure that provides a greatest profit for a seller for each of the plurality of consumer products. In one embodiment, when the consumer is not very particular about the product, the seller can determine which product from the plurality of the consumer products he wants to sell to the consumer, for example, on the basis of profit/price ratio and the demand for that particular product.

Another embodiment can be characterized as a method of determining a structure for financing a consumer product through a computer implemented process comprising the steps of: receiving one or more inputs including a monthly payment value and a down payment value; storing a first dealer profit value calculated using the monthly payment value, the down payment value and a first of a plurality of loan-term lengths; calculating a second dealer profit value based upon the monthly payment value, the down payment value and a second of the plurality of loan-term lengths; and determining the greater of the first dealer profit value and the second dealer profit value.

A subsequent embodiment includes a method of determining a structure for financing a consumer product through a computer implemented process comprising the steps of: receiving one or more inputs including a monthly payment value and a down payment value; storing a first dealer profit value calculated based upon the monthly payment value, the down payment value and a first of a plurality of loan-term lengths; calculating an amount financed value based upon at least the monthly payment value and a second of a plurality of loan-term lengths; calculating a vehicle purchase price based upon at least the amount financed value and the down payment value; calculating a second dealer profit value based upon a second of the plurality of loan-term lengths; and determining the greater of the first dealer profit value and the second dealer profit value.

BRIEF DESCRIPTION OF THE DRAWINGS

The above and other aspects, features and advantages of the present embodiments will be more apparent from the following more particular description thereof, presented in conjunction with the following drawings, wherein:

FIG. 3 is a diagram depicting a screen shot of a software program for a sub-prime automobile financing system according to one embodiment;

FIG. 4 is a diagram depicting a screen shot of the software program shown in FIG. 3, where the software program permits a sub-prime financing procedure to be applied to a specified car, or to all cars in a dealership inventory;

FIG. 6 is a diagram depicting a screen shot of the software program shown in FIG. 3, where the software program has adjusted the terms of a deal structure (e.g., price and loan-term length) for a specific car in response to input of the down payment valued and the monthly payment value such as depicted in FIG. 5;

Figure 1:
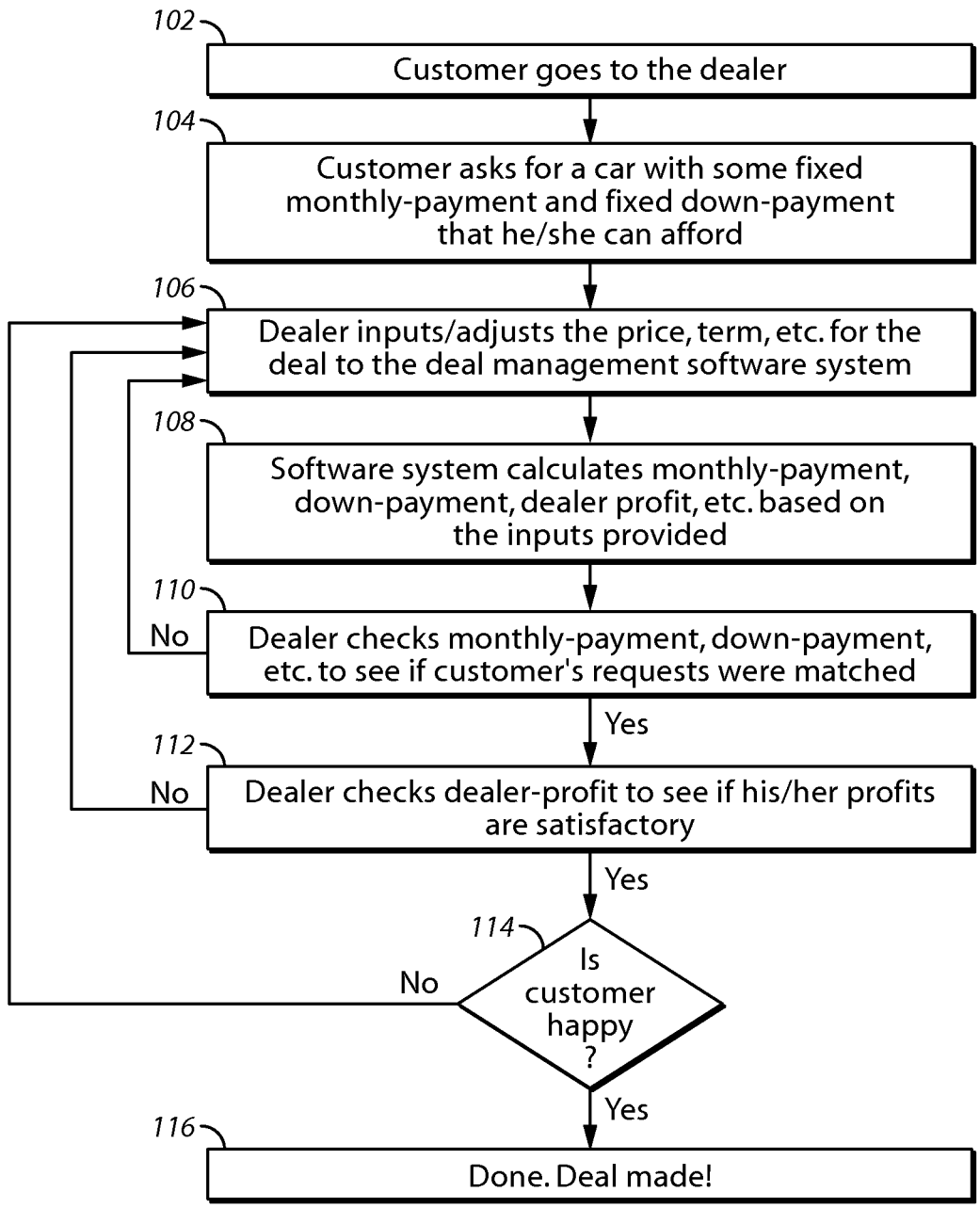
FIG. 1 is a flow diagram depicting a sub-prime automobile financing procedure according to the prior art.

Corresponding reference characters indicate corresponding components throughout the several views of the drawings. Skilled artisans will appreciate that elements in the figures are illustrated for simplicity and clarity and have not necessarily been drawn to scale. For example, the dimensions, sizing, and/or relative placement of some of the elements in the figures may be exaggerated relative to other elements to help to improve understanding of various embodiments. Also, common but well-understood elements that are useful or necessary in a commercially feasible embodiment are often not depicted in order to facilitate a less obstructed view of these various embodiments. It will also be understood that the terms and expressions used herein have the ordinary meaning as is usually accorded to such terms and expressions by those skilled in the corresponding respective areas of inquiry and study except where other specific meanings have otherwise been set forth herein.

DETAILED DESCRIPTION

The following description is not to be taken in a limiting sense, but is made merely for the purpose of describing the general principles of the embodiments described herein. The scope of the invention should be determined with reference to the claims. The present embodiments address the problems described in the background while also addressing other additional problems as will be seen from the following detailed description.

The embodiments described herein below are specific to the sub-prime auto financing industry; however, the system and methods described can also optionally be utilized in other industries, such as, for example the financing of any new or used vehicle or consumer product, such as automobiles, motorcycles, All Terrain Vehicles (ATVs), campers, Recreational Vehicles (RVs), boats, jet skis, water craft and other consumer products that can be financed.

Additionally, the some of the following embodiments greatly enhanced the ability of a dealer to close a deal the same day that the person walk onto the lot and aid a dealer in putting together the best deal possible. A 'best deal' is a deal that maximizes the dealer profit within the constraints of the down payment amount and the monthly payment amount a customer can afford. Dealer profit is not necessarily maximized by just increasing the price of the vehicle to allowable limits.

Referring to FIG. 1 a flow diagram 100 is shown depicting a sub-prime automobile financing procedure according to the prior art.

First, in step 102, a customer goes to a dealership to review car inventory in the hopes of finding a vehicle to purchase. If the customer can not pay for the vehicle with available cash, the customer will most likely look to finance the vehicle. A sub-prime customer (i.e. a customer with a credit score that is less than ideal) brings the initial down payment to the deal and also usually has a requested maximum monthly payment. The customer is generally less concerned (if at all) with other terms of the deal, such as, for example, the vehicle cost, the vehicle type, loan term and the interest rate of the loan. These other terms of the deal are less important because the customer generally is simply looking to purchase any vehicle he/she qualifies for.

Next, in step 104, the customer will ask to see what vehicles he/she qualifies for based on the down payment and the monthly payment the customer can afford. In step 106, the dealer utilizes a software program, such as the Deal Management Software System, disclosed and described in U.S. patent application Se. No. 10/043,676, filed Jan. 9, 2002, entitled METHODS AND SYSTEMS FOR DEAL STRUCTURING FOR AUTOMOBILE DEALERS, to input or adjust the price, financing loan-term length, interest rate, trade-in value of the customer's vehicle, and other input parameters to try meet the customer's needs. Another such program is described in U.S. patent application Ser. No. 11/332,616, filed Jan. 13, 2006, entitled METHODS AND SYSTEMS FOR DEAL STRUCTURING FOR AUTOMOBILE DEALERS which application is incorporated herein by reference in its entirety.

Based on the values input by the dealer, the software program calculates the customer's monthly payment, down payment, the dealer's gross profit from the sale, and other information, as shown in step 108. Following, in step 110, the dealer compares the resulting monthly and down payments and other factors with those requested by the customer. If the monthly and down payments and other factors are comparable to those requested by the customer, the dealer moves on to step 112. Otherwise, the dealer must go back to step 106 and adjust the price, term, interest rate, and other variables of the deal. At step 112, the dealer checks to see whether he will sufficiently profit from the deal. For instance, if the dealer has a minimum desired gross profit of $1000 per car, and the profit from the deal results in only an $800 profit, the dealer will adjust the price, term, interest rate, and other variables of the deal at step 106.

Once the dealer's profit meets a sufficient level and the customer's down payment value and monthly payment value have been approximately met, at step 114, the dealer presents the deal to the customer, who can either reject the deal, sending the process back to step 106, or accept the deal, as shown in step 116. Presumably, the customer will accept the deal, since the customer's requests regarding the monthly payment and the down payment have been met. As is apparent, this prior art procedure requires the dealer to manually adjust terms of the deal to try to meet both the dealer's and the customer's financial needs. Additionally, this can result in financing deals that do not provide the dealer with the greatest profit as there is no way for the dealer to know what deal structure will provide him/her the greatest profit, waste the dealer and customer's time, potentially leave the customer buying a car that does not best meet his/her needs and potentially lose business by not making a deal at all.

In order to solve the problems described above and enhance automated financial approval systems, various systems and methods for structuring a loan that provides a dealer with the greatest profit are described below with reference to FIGS. 2-9.

Figure 2:
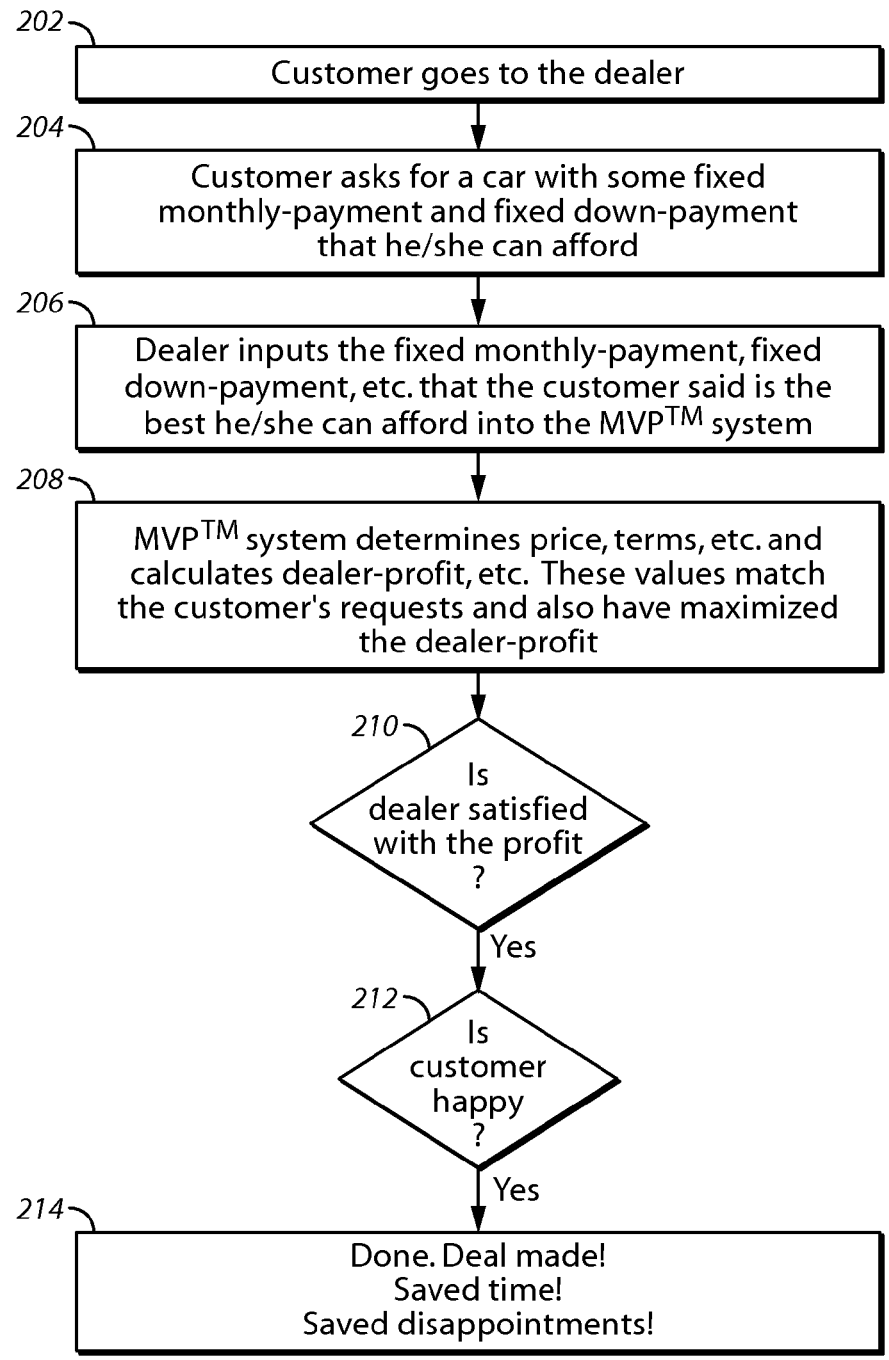
FIG. 2 is a flow diagram depicting a sub-prime automobile financing procedure according to one embodiment.

Referring now to FIG. 2, a flow diagram 200 is shown depicting a sub-prime automobile financing procedure according to one embodiment.

At step 202, a customer having sub-prime credit goes to a dealership to review car inventory in the hopes of finding a vehicle to purchase. As described above, if the customer can not pay for the vehicle with available cash, the customer will most likely look to finance the vehicle. A sub-prime customer (i.e. a customer with a credit score that is less than ideal) brings the initial down payment to the deal and also usually has a requested maximum monthly payment. Similar to above, the customer is generally less concerned (if at all) with other terms of the deal, such as, for example, the vehicle cost, the vehicle type, and the interest rate of the loan. These other terms of the deal are less important because the customer generally is simply looking to purchase any vehicle they qualify for.

Next, in step 204, the customer will ask to see what vehicles they qualify for based on the down payment and the monthly payment the customer can afford. At step 206, the dealer inputs the customer's desired down payment and monthly payments, and other considerations (e.g., trade-in allowance), into a sub-prime automobile financing software application for a particular vehicle in his/her vehicle inventory. In accordance with the present embodiment, the software application includes dealer profit maximizing feature. This feature of the software application is referred to herein, for example as "Maximize Vehicle Profit" or the MVP™ system or application. Based on the input values for the down payment and monthly payment, in step 208, the MVP™ system automatically determines the terms of the deal (e.g., vehicle price, loan-term length, and the interest rate) that provide the dealer with the greatest profit while meeting the desired financial terms of the customer. No guess work or re-entering of terms is necessary such as was required in the prior art systems described above. One exemplary process of maximizing the dealer profit for a vehicle is described herein below with reference to FIG. 7.

At step 210, the dealer checks to see whether he will sufficiently profit from the deal. Since the MVP™ system maximizes the profit for the dealer for any particular car, the dealer will always be happy with a deal unless there is no combination of deal terms for the car that meets the dealer's minimum profit requirement. One embodiment that is discussed below with reference to FIGS. 8 and 9 permits the dealer to pre-select only those cars that will meet his profit requirement. At this point, the dealer will present the financial terms of the deal to the customer at step 212 or will require the customer to choose a different car. Because the deal is structured to always exactly or approximately meet the customer's requests regarding the monthly payment amount and the down payment amount, the customer has a high probability of accepting the deal, as shown in step 214.

Referring next to FIG. 3, a diagram is shown illustrating a screen shot of a software program for a sub-prime automobile financing system 300 according to one embodiment. It should be understood that many different types of information and user interfaces can be utilized in various embodiments and that the specific implementation shown in this application is merely illustrative of one user interface. The various display panels and information provided to the user will vary in different embodiments.

The automobile financing system 300 includes a user interface screen 302. The user interface screen 302 includes four display panels: a deal structure panel 304, a calculation results panel 306, a vehicle information panel 308, and an approval panel 310. The user interface screen 302 also includes a dealer profit maximizing function 312 (also referred to herein as the MVP™ function 312). The user interface screen 302 can optionally also includes another section that contains customer's credit report information and other demographics.

The deal structure panel 304 displays information related to the structure of the deal. For instance, the deal structure panel 304 displays the terms of the deal, including: price of the financed car, a trade-in value given to a car traded in by the customer, the amount still owed on the trade-in vehicle, the amount of cash down to be paid by the customer, the cost of a service contract for the vehicle, title fees, insurance, and gap-insurance charges, and the amount of taxes to be paid by the customer. Further terms include the number of payments (loan-term length), the amount of each payment, the date of the first payment, and the sales tax rate.

The deal structure panel 304 is also user editable such that the terms can be changes by a user by clicking or navigating to the term display field and typing in any specified amount. For instance, to edit the price of the car, a user would click on the current price (depicted in FIG. 3 as $6,427.25) and type in a new price. When terms in the deal structure panel 304 are edited, some non-editable values in the deal structure panel 304, the deal approval panel 310 and the calculation results panel 306 are updated accordingly. For instance, raising the price of the car will automatically update the sales tax in the deal structure panel 304, and automatically update the dealer gross in the calculation results panel 306.

Finally, the deal structure panel 304 displays the maximum amount of financing the customer is permitted to obtain (i.e., "MAX OK TO FIN"). The amount permitted to be financed is based on several factors, such as, for example, the customer's credit score and the worthiness of the car that comes after taking into consideration the input values in the panel 308. In one exemplary embodiment, the automobile financing system 300 utilizes the credit processing features described in U.S. patent application Ser. No. 10/043,676, filed Jan. 9, 2002, entitled METHODS AND SYSTEMS FOR DEAL STRUCTURING FOR AUTOMOBILE DEALERS to pull the customer's credit scores and to determine the amount of financing to afford the customer.

The calculation results panel 306 displays the fees to be paid by the dealer, and the dealer profit for the terms of the current deal. For instance, the calculation results panel 306 displays the amount of the dealer's financial services fee (shown in FIG. 3 as "Westlake Discount") and acquisition fee. The financial services fee is generally set by the financing company, and may be a fixed cost, or may be based on factors such as the sale price of the vehicle, amount to be financed, the vehicle being sold, the customer worthiness and the interest rate. The calculation results panel 306 also displays how much money will be paid to the dealer (shown in FIG. 3 as "Net Check to Dealer"), which is equal to the amount financed, less the financial services fee (shown as "Discount" in the calculation results panel 306) and acquisition fee. The calculation results panel 306 also displays the amount of profit the dealer will make on the deal (shown in FIG. 3 as "Dealer Gross"). The dealer's profit, in the present example, is equal to the sale price of the car, plus document fees, plus warranty amount, less warranty cost, less the cost of the vehicle (shown as "Cost" in the vehicle information panel 308), less the financial services fee, less acquisition fee and the overadvance amount. The overadvance amount is the difference between actual amount financed and the "MAX OK TO FIN" if actual amount financed is more than the "MAX OK TO FIN" within some prescribed limit (e.g., $1000.00). Certain finance companies let the dealer pay the difference till the entire loan-term length is successfully over without customer defaulting in between. Once the loan-term length is over, the financing company returns this difference amount back to the dealer. Not all finance companies have a loan structure that includes the concept of an "overadvance," thus the above calculation is only illustrative and a dealer's profit can be calculated differently in other embodiments. For example, the above calculation may include or exclude differently variables depending upon the structure of the deal.

The vehicle information panel 308 displays information pertaining to a selected vehicle. For example, a vehicle from the dealer's local inventory or a vehicle from a larger dealer network can be selected and the information about the selected vehicle will be displayed in the vehicle information panel 308. Information that is displayed in the vehicle information panel 308 includes, for example, vehicle make, model, year, mileage, NADA book value/KBB book value, car cost to the dealer, car class type, car type. The information can also include warranty cost to the dealer and the finance charge/profit to the financing company. Again, as mentioned above, different fields will be displayed to a user depending upon the specific user interface of the software application.

The deal approval panel 310 displays whether the structure of the deal and the amount financed are approved. Whether the deal is approved depends upon the terms of the deal, such as, for example, the vehicle price, number of payments (term length), and amount of each payment. For instance, if the lender will not finance any buyer for more than 40 months, when a deal calls for a term of 50 months, the deal structure will not be approved. If the dealership refuses to sell any car for less than $500, a deal with a sale price of $450 will also be rejected. The amount financed approval depends upon whether the amount financed exceeds the approved maximum financing amount that was discussed above. If the amount financed exceeds the approved maximum, the deal will have to be restructured in order for the deal to be approved. As described above, in prior systems, a dealer would need to manipulate the various terms of the deal in an effort to find a structure that is approved and also provides the dealer with an acceptable profit on the vehicle. The deal that is best for the dealer is likely not readily apparent to the dealer causing a dealer, for example, to accept any approved deal.

In accordance with the embodiments described herein, the MVP™ function 312 automatically structures any deal to maximize the dealer's profit as well as satisfies the constraints on down payment and monthly payment put forth by the customer.

Figure 4:
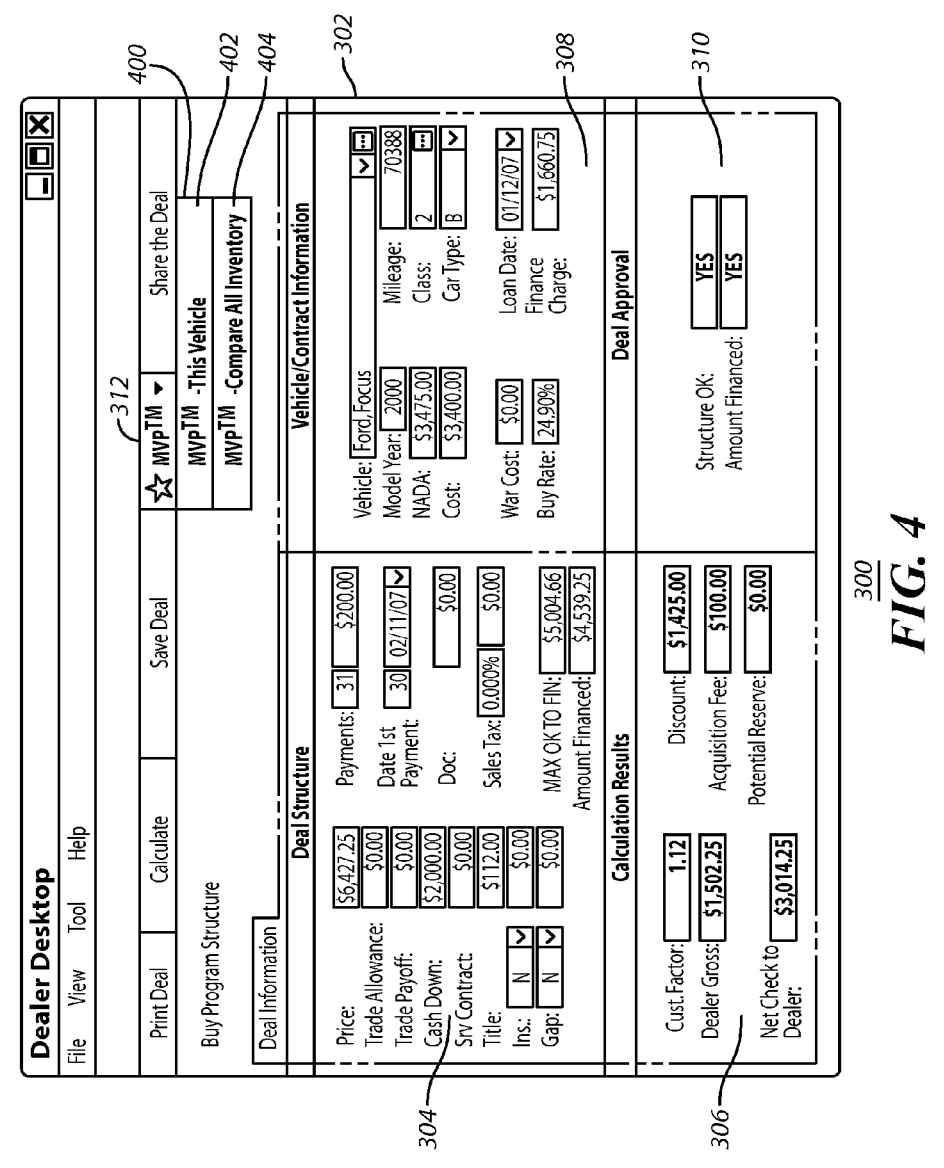

Referring next to FIG. 4, a diagram is shown illustrating a screen shot of the software program shown in FIG. 3, wherein the software program permits a sub-prime financing procedure to be applied to a specified car, or optionally to all cars in a dealership inventory. According to one embodiment, as shown in FIG. 4, when a user accesses the MVP™ function 312, the automobile financing system 300 displays an option window 400. The option window 400 comprises a current vehicle feature 402 that permits the dealer profit maximizing function to be applied to a specific car, and a compare all inventory feature 404 that applies the dealer profit maximizing function to all cars accessible to the dealership through its inventory and/or dealership network.

If a user selects the compare all feature 404 instead of the current vehicle feature 402, then the MVP™ function 312 will be applied to all cars accessible to the dealership through its inventory and/or dealership network. This procedure is described below with reference to FIGS. 8 and 9. According to one embodiment, if a user selects the current vehicle feature 402, the MVP™ function 312 is applied to the vehicle currently displayed in vehicle information panel 308. Upon selection of the current vehicle feature 402 the software program proceeds in prompting the user for information such as is shown in FIG. 5.

Figure 5:
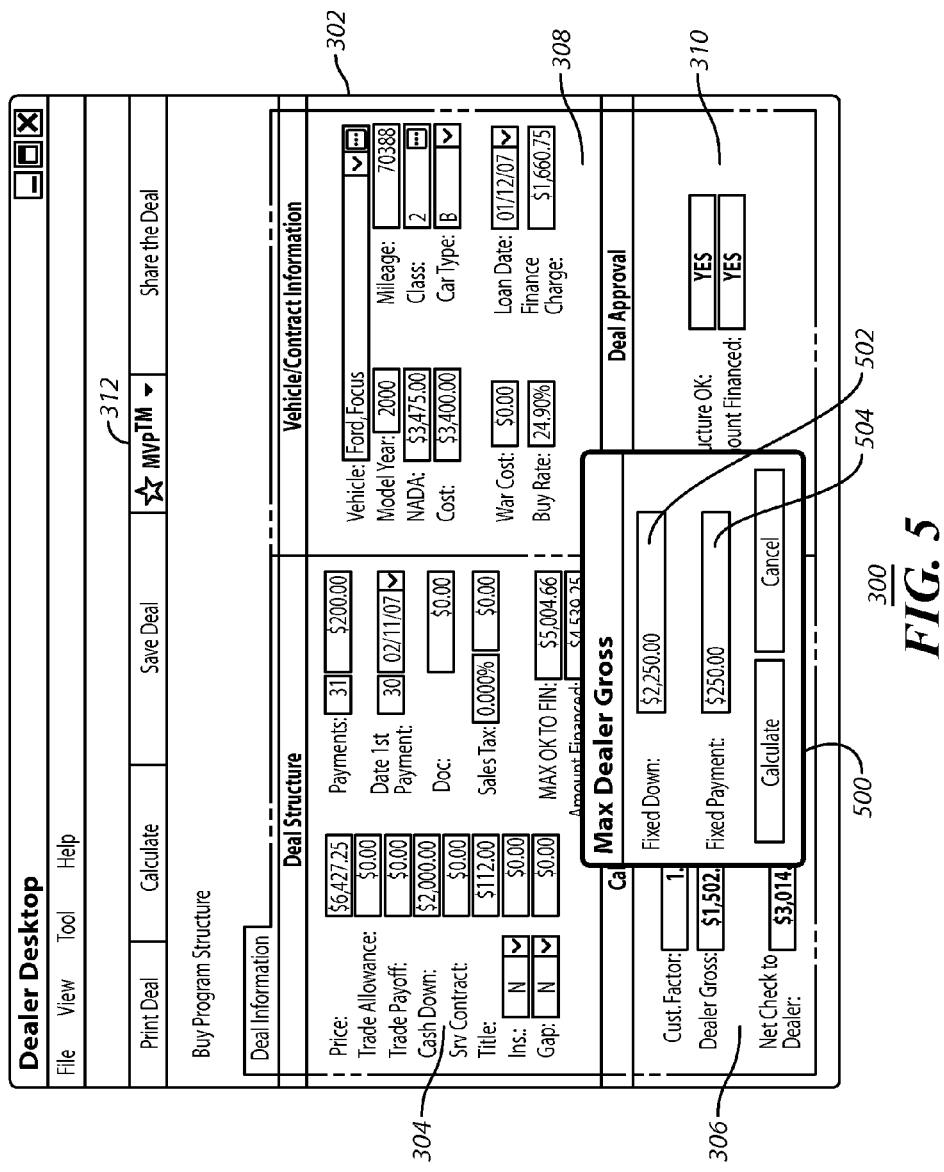
FIG. 5 is a diagram depicting a screen shot of the software program shown in FIG. 3, where the software program prompts a user to input a down payment value and monthly payment value according to one embodiment.

Referring next to FIG. 5 a diagram is shown depicting a screen shot of the software program shown in FIG. 3, where the software program prompts a user to input a down payment value and monthly payment value by displaying a prompt window 500 according to one embodiment.

The prompt window 500 includes a down payment field 502, and a monthly payment field 504. The user enters the a down payment value that the customer says he/she can afford into down payment field 502, a monthly payment value that the customer says he/she can afford into monthly payment field 504, and selects "Calculate." The software program then automatically adjusts the loan-term length and vehicle price to maximize the dealer's profits. Thus, as shown in FIGS. 4, 5, and 6, when a down payment of $2,250.00 and a monthly payment of $250.00 are input into the prompt window 500, the price of the car is raised from $6,427.25 to $7,122.73, the number of payments/loan-term is reduced from 31 to 26, and the dealer profit increases from $1,502.25 to $2,062.73. In prior systems, the dealer would have had to guess and the various terms (e.g., the Loan-Term and Vehicle Price) in order to maximize his/her profit. This was a time consuming and unreliable process if it was even attempted by the dealer. Due to the large number of combinations of Term and Vehicle Price, there is a good chance that the dealer would end up putting together a deal that did not provide him/her with the greatest profit. One exemplary process for determining the maximum profit for the dealer is described with reference to FIG. 7.

Figure 7:
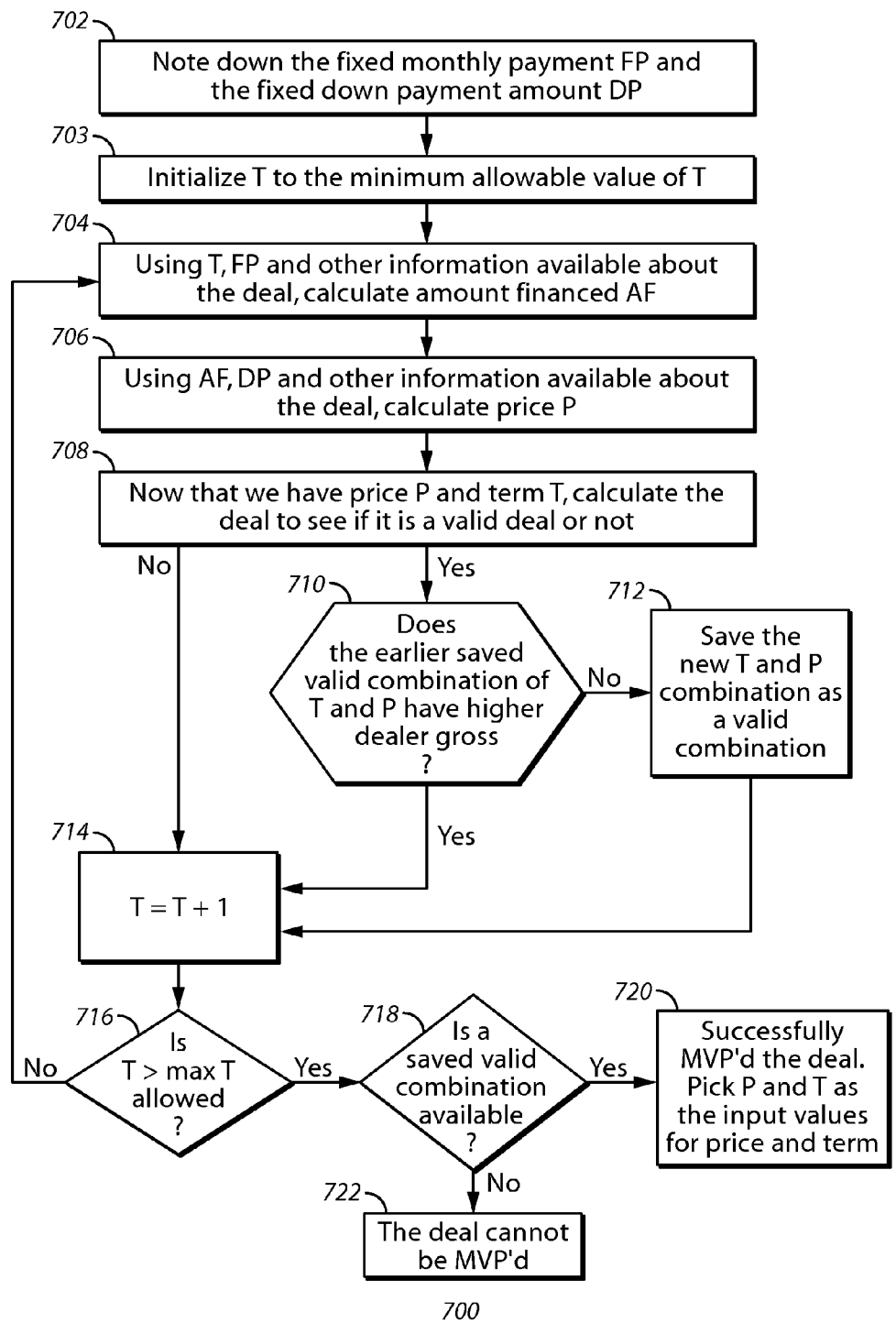
FIG. 7 is a flow diagram depicting a method for maximizing a dealer's gross profit on a financial transaction of a vehicle according to one embodiment.

Referring next to FIG. 7, a flow diagram 700 is shown depicting an exemplary method for maximizing a dealer's gross profit on a financial transaction of a vehicle according to one embodiment. Generally, the software program operates by varying the length of the term (T) (i.e. the number of payments required before the loan is paid off) to maximize the dealer's profit for the selected vehicle.

First, at step 702, the customer's desired monthly payment (FP) and down payment (DP) are input into the system 300, as discussed above with reference to FIG. 6. Following, at step 703, T is initialized to a minimum allowable value for T. The initial value of T is a minimum value specified by the dealership, the system 300, or by the customer and can be dependent on a number of variables, including, for example, a credit score, loan amount or buyer income among other things. Optionally, the minimum value of T can be set to one (1) indicating only one monthly payment will be necessary to pay off the loan. Alternatively, for example, T can be set to twelve (12) indicating a loan-term of one year. Next, at step 704, the software program calculates the amount (A) to be financed for loan-term length (T). The amount (A) to be financed can be calculated, for example, using the following formula, where APR is an annual percentage rate (APR):

$$A = FP * [1 - \{1 + (APR/12)\}^{-T}]$$

Since the customer specifies the desired monthly payment value (FP), as discussed above, and since the APR is a constant rate usually specified by the financier, the amount to be financed is varied only by the current term length (T).

Next, at step 706, the resulting vehicle sale price (P) is calculated. The vehicle sale price (P) is determined, for example, by using the following formula:

$$P = A - DP + (\text{Trade-In Allowance}) - (\text{Document-Fees}) - (\text{Smog-Fees}) - (\text{Sales Taxes}) - (\text{Warranty-Amount}) - (\text{License-Fees}) - (\text{Trade-Payoff}) - (\text{Insurance-Amounts}) - (\text{Miscellaneous})$$

Aside from the amount (A) to be financed which we calculated above, the remainder of the variables are either constant or a linear or non-linear function of other constants and Price. Because of this inherent non-linearity, the relation between price (P) and A is directly proportional, though not necessarily linear.

All of the calculations described herein are exemplary for a specific automated financial software program (or potentially partially automated) loan approval system. However, the calculations can easily be modified to work with any kind of financial approval system. For example, the non-linearity/linearity described above may not be present in other financial systems. Thus, one of ordinary skill in the art would be able to adapt the equations and calculations described herein to other financial systems that may have a different approval process or different costs that must be taken into account when structuring the entire deal.

Following, at the next step, step 708, after calculating the vehicle sale price (P), it is determined whether the structure of the deal and the amount (A) to be financed are approved, as discussed above. The next step involves calculating the dealer profit according to the following formula:

$$(\text{Dealer-Profit}) = (\text{Vehicle-Sale-Price}) - (\text{Vehicle-Purchase-Price}) - (\text{Financial-Services-Fee}) - (\text{Acquisition Fee}) + (\text{Document-Fees}) + (\text{Warranty Amount}) - (\text{WarrantyCost}) - (\text{OverAdvance Amount})$$

The Vehicle-Sale-Price, Acquisition Fee and Vehicle-Purchase-Price are constant or determined from the previous step. The Financial-Services-Fee varies depending upon the structure of the deal and is calculated, for example, as described in U.S. patent application Ser. No. 11/332,616, filed Jan. 13, 2006, entitled METHODS AND SYSTEMS FOR DEAL STRUCTURING FOR AUTOMOBILE DEALERS. The remainder of the components are either constant or vary as per the deal structure.

If the structure and amount are not approved, the process continues to step 714. Otherwise, the process continues to step 710 where the dealer profit is compared to a prior recorded dealer profit (e.g., for a different term length T). If the newly computed dealer profit is larger than the prior recorded dealer profit, the current values for the loan-term T, vehicle sale price (P), and dealer profit are stored and the prior recorded values from step 712 are disregarded. However, if the previously recorded values have a higher dealer profit, they remain saved and the process continues to step 714. It should be understood that for the first value of T that provides an approved deal, no comparison needs to be made, the values for loan-term T, vehicle sale price (P), and dealer profit are simply stored by the software program.

At step 714, the value of T is incremented, for example by one interval corresponding to a term length of T+1. Alternatively, if the financing loan-term is only valid in 3 or 6 month increments, then T can be increased by 3 or 6, respectively. Next, at step 716, the new value of T is compared to a maximum permitted value of T. Generally, the maximum value permitted for T is, for example, 72, indicating the loan will be paid off after 6 years. However, the maximum value for T can be changed depending upon the credit score, loan amount or other variables. If the value of T is less than or equal to the maximum value for T, the process returns to step 704, where steps 704 through 716 are repeated with the new, larger value of T. Otherwise, the process moves to step 718, where the MVP™ function determines whether any terms are stored. If none are stored, no combination of terms met the approval process discussed above within the constraints put forth by the customer for that particular vehicle/car. If, however, there are stored terms, they reflect those terms that maximize the dealer profit. These terms are considered the optimized solution for the dealer and the customer, and are selected to specify the terms of the deal, as indicated in step 720. These are the terms that give the dealer the greatest profit on the vehicle.

In this way, after iterating from the minimum to maximum value for T, the terms that maximize the dealer profit for a given vehicle are always identified and selected. It is important to note that in one embodiment, however, since the financial services fee is determined based on the cost of the vehicle and/or the amount financed, merely having the highest possible vehicle sale price does not guarantee the highest possible dealer profit. Thus, a dealer who did not have access to the MVP™ function 312 described herein would likely have a very hard time attempting to structure a deal that provides the dealer with the greatest profit.

Additionally, as described herein, the "greatest profit" or "maximum profit" describes a value that is the largest value out of a plurality of values that are calculated using a finite number of term lengths T. Generally, when structuring a loan, the T will be an integer number corresponding to a number of months of the term of a loan. Thus, the "greatest profit" or "maximum profit" may not be the absolute maximum dollar amount that can be calculated using the above equations (or other suitable equations), but is the greatest value when taking into consideration the general constraints of a loan. For example, there is a limit on minimum Payment amount per month that the finance company will accept. Thus, while the above equations may provide a result, the finance company will not approve the loan.

Referring back to FIG. 4, in one embodiment, if a user selects the compare all inventory feature 404 instead of the current vehicle feature 402, then the MVP™ function 312 will be applied to all cars accessible to the dealership through its inventory and/or dealership network.

Figure 8:
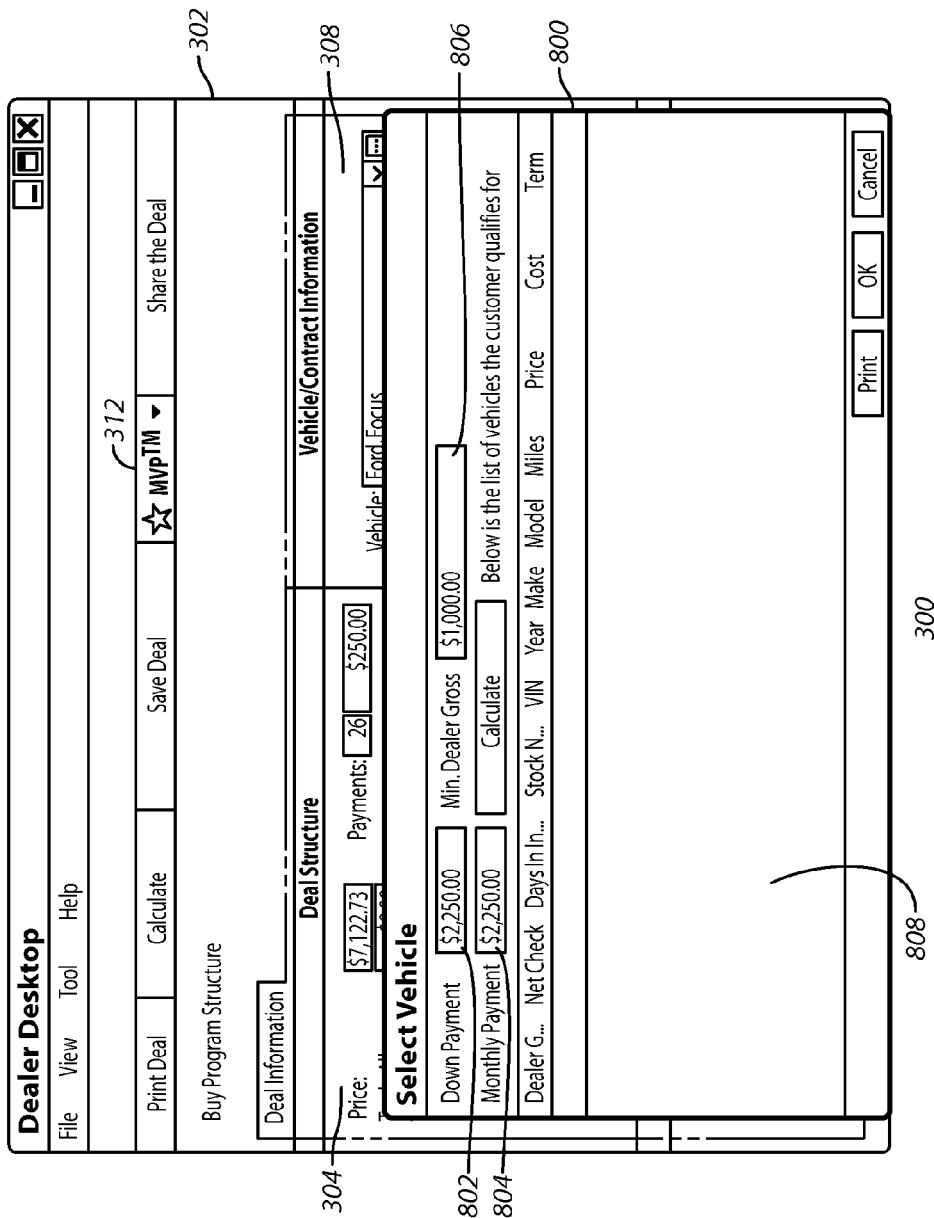
FIG. 8 is a diagram depicting a screen shot of the software program shown in FIG. 3, where the software program prompts a user to input a down payment value, a monthly payment value, and the minimum dealer profit acceptable by the dealer for a sale according to one embodiment.

FIG. 8, is a diagram illustrating a screen shot of the software program shown in FIG. 3, where the software program prompts a user to input a down payment value, a monthly payment value, and the minimum dealer profit acceptable for a sale according to one embodiment. As shown in FIG. 8, after selecting the compare all feature 404, system 300 displays a vehicle listing window 800 comprising a down payment field 802, a monthly payment field 804, a minimum dealer profit field 806 and a vehicle list 808. The user enters the customer's desired down payment into down payment field 802, the customer's desired monthly payment into monthly payment field 804, the dealer's desired minimum profit into minimum dealer profit field 806, and selects "Calculate."

Figure 9:
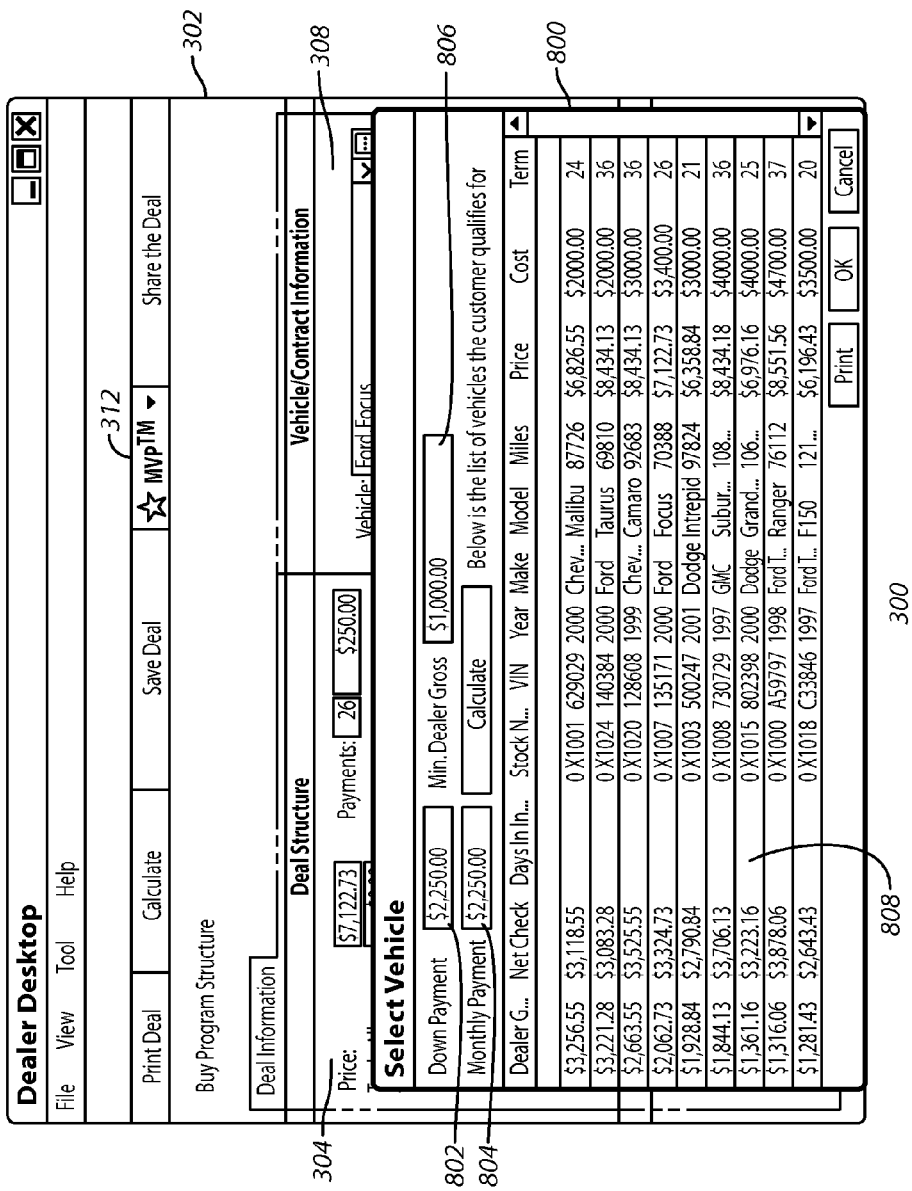
FIG. 9 is a diagram depicting a screen shot of the software program shown in FIG. 3, where the software program rank orders a dealer's inventory of cars according to the gross profit possible for the dealer, based on the input of a customer's fixed down payment, the customer's fixed monthly payment, and the minimum dealer gross acceptable for a sale, as depicted in FIG. 8.

FIG. 9 is a diagram illustrating a screen shot of the software program shown in FIG. 3, where the software program rank orders a dealer's inventory of cars according to the gross profit possible for the dealer, based on the input of a customer's fixed down payment, the customer's fixed monthly payment, and the minimum dealer gross acceptable for a sale. As shown in FIG. 9, the software program (MVP™ function 312) then automatically displays a listing of all the vehicles in the dealer's inventory and/or dealership network that meet the specified criteria in vehicle list 808. The vehicles are rank ordered by dealer profit, which is the maximum amount of profit the dealer will make if he sells the particular vehicle using the MVP™ function 312 specified deal terms. Thus, the MVP™ function 312 permits a dealer to identify cars that will maximize his profit for a given customer prior to trying to sell any car to the customer, saving time and hassle, and ensuring both the dealer and the customer are satisfied with the deal and the vehicle eventually chosen. The software program runs the method described above with reference to FIG. 7 for every car on the lot and displays a list of all of the vehicles for which a valid deal can be put together. As described, the list is ordered by the maximum dealer profit that can be obtained for each vehicle. If the dealer's maximum profit for a specific car is lower than the minimum dealer profit specified in field 806, then the car is dropped from consideration. Once each car in the dealer's inventory and/or dealer network has been considered, those that meet the dealer's minimum profit threshold are rank ordered and displayed to the user in vehicle list 808.

When the dealer selects any vehicle in the vehicle list 808, the MVP™ function 312 specified deal terms are automatically propagated into the term display fields of deal structure panel 304, and the vehicle information is automatically displayed by the vehicle information panel 308. The compare all feature 404 of the software program described above with reference to FIG. 4, according to one embodiment, operates very similarly to the current vehicle feature 402 discussed above, and only adds an additional iterative loop. That is, for each car in the dealer's inventory and/or dealer network, the software programs operates as described above with respect to the current vehicle feature 402 and the method described in FIG. 7.

Similar to the above, the "greatest profit" or "maximum profit" describes a value that is the largest value out of a plurality of values that are calculated using a finite number of term lengths T. Generally, when structuring a loan, the T will be an integer number corresponding to a number of months of the term of a loan. Thus, the "greatest profit" or "maximum profit" may not be the absolute maximum dollar amount that can be calculated using the above equations (or other suitable equations), but is the greatest value when taking into consideration the general constraints of a loan. For example, as described above, there is a limit on minimum Payment amount per month that the finance company will accept. Thus, while the above equations may provide a result, the finance company will not approve the loan.

Figure 10:
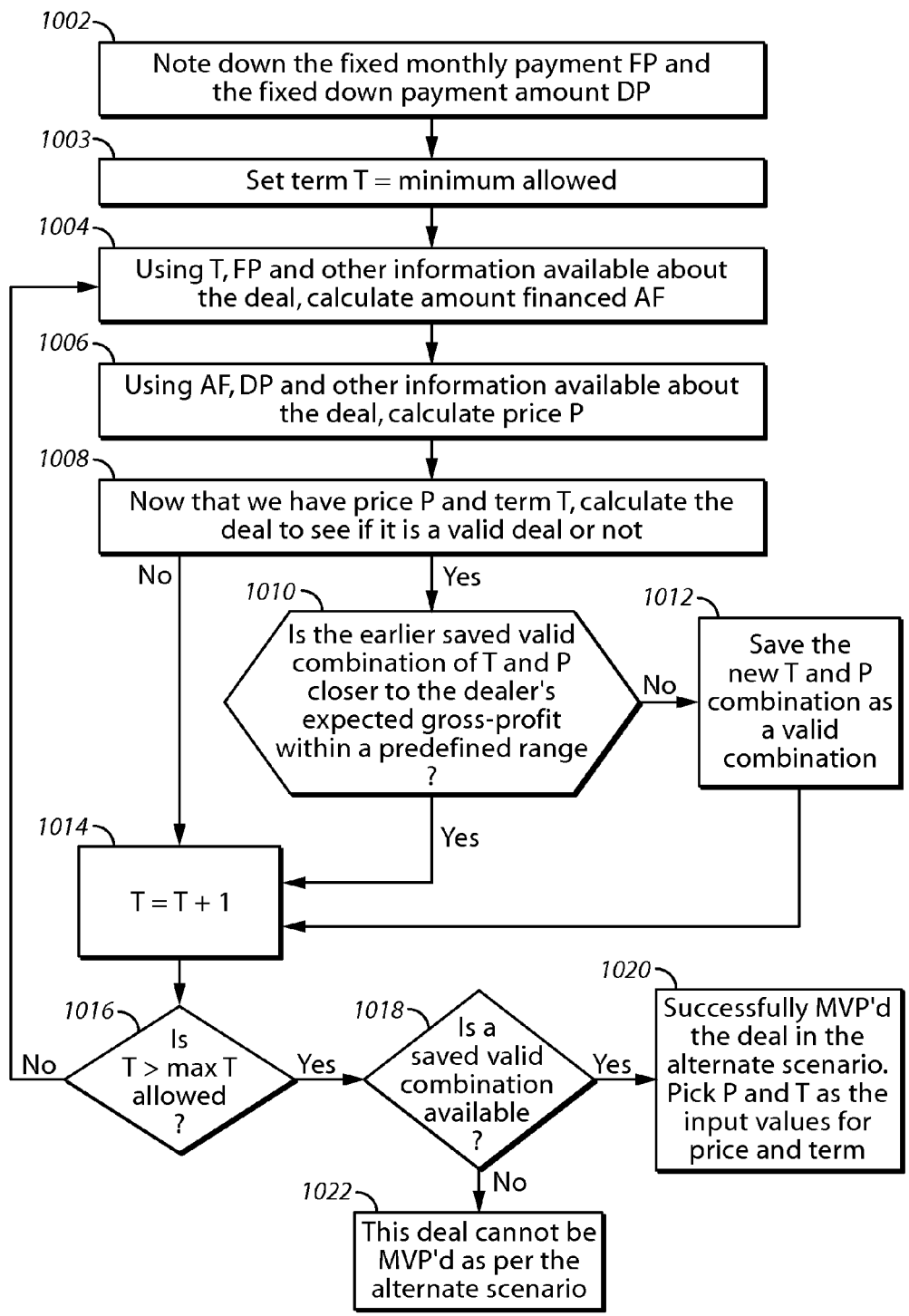
FIG. 10 is a flow diagram depicting a method for determining a maximum dealer's gross profit on a financial transaction of a vehicle while taking into consideration certain limiting factors according to one embodiment.

Referring next to FIG. 10, a flow diagram 1000 is shown depicting an exemplary method for maximizing a dealer's gross profit on a financial transaction of a vehicle while taking into consideration certain limiting factors according to one embodiment. Generally, the software program operates by varying the length of the term (T) (i.e. the number of payments required before the loan is paid off) to maximize the dealer's profit for the selected vehicle. Additionally, the software program can limit other variables in the calculations (e.g., a maximum loan-term length that the buyer is willing to accept) and determine the best structure for the dealer while meeting the buyers needs.

First, at step 1002, the customer's desired monthly payment (FP) and down payment (DP) are input into the system 300, as discussed above with reference to FIG. 6. Following, at step 1003, T is initialized to a minimum allowable value for T. The initial value of T is a minimum value specified by the dealership, the system 300, or by the customer and can be dependent on a number of variables, including, for example, a credit score, loan amount or buyer income among other things. Optionally, the minimum value of T can be set to one (1) indicating only one monthly payment will be necessary to pay off the loan. Alternatively, for example, T can be set to twelve (12) indicating a loan-term of one year. Next, at step 1004, the software program calculates the amount (A) to be financed for loan-term length (T). The amount (A) to be financed can be calculated, for example, using the following formula, where APR is an annual percentage rate (APR):

$$A = FP * / 1 - \{1 + (APR/12)\}^{-T}]$$

Since the customer specifies the desired monthly payment value (FP), as discussed above, and since the APR is a constant rate usually specified by the financier, the amount to be financed is varied only by the current term length (T).

Next, at step 1006, the resulting vehicle sale price (P) is calculated. The vehicle sale price (P) is determined, for example, by using the following formula:

$$P = A - DP + (\text{Trade-In Allowance}) - (\text{Document-Fees}) - (\text{Smog-Fees}) - (\text{Sales Taxes}) - (\text{Warranty-Amount}) - (\text{License-Fees}) - (\text{Trade-Payoff}) - (\text{Insurance-Amounts}) - (\text{Miscellaneous})$$

Aside from the amount (A) to be financed which we calculated above, the remainder of the variables are either constant or a linear or non-linear function of other constants and Price. Because of this inherent non-linearity, the relation between price (P) and A is directly proportional, though not necessarily linear.

Following, at the next step, step 1008, after calculating the vehicle sale price (P), it is determined whether the structure of the deal and the amount (A) to be financed are approved, as discussed above. The next step involves calculating the dealer profit according to the following formula:

$$(\text{Dealer-Profit}) = (\text{Vehicle-Sale-Price}) - (\text{Vehicle-Purchase-Price}) - (\text{Financial-Services-Fee}) - (\text{Acquisition Fee}) + (\text{Document-Fees}) + (\text{Warranty Amount}) - (\text{WarrantyCost}) - (\text{OverAdvance Amount})$$

The Vehicle-Sale-Price, Acquisition Fee and Vehicle-Purchase-Price are constant or determined from the previous step. The Financial-Services-Fee varies depending upon the structure of the deal and is calculated, for example, as described in U.S. patent application Ser. No. 11/332,616, filed Jan. 13, 2006, entitled METHODS AND SYSTEMS FOR DEAL STRUCTURING FOR AUTOMOBILE DEALERS. The remainder of the components are either constant or vary as per the deal structure.

Again, as stated above, all of the calculations described herein are exemplary for a specific automated financial software program (or potentially partially automated) loan approval system. However, the calculations can easily be modified to work with any kind of financial approval system. For example, the non-linearity/linearity described above may not be present in other financial systems. Thus, one of ordinary skill in the art would be able to adapt the equations and calculations (or create different calculations and equations) described herein to other financial systems that may have, for example, a different approval process or different costs that must be taken into account when structuring the entire deal.

If the structure and amount are not approved, the process continues to step 1014. Otherwise, the process continues to step 1010 where the dealer profit is compared to a prior recorded dealer profit (e.g., for a different term length T). If the newly computed dealer profit is, for example, closer to the dealer's expected gross-profit within a predefined range, the current values for the loan-term T, vehicle sale price (P), and dealer profit are stored and the prior recorded values from step 1012 are disregarded. However, if the previously recorded values are closer to the dealer's expected gross-profit, they remain saved and the process continues to step 1014. In this example, an additional input into the system is an "expected gross-profit value" that introduces an additional variable that needs to be taken into consideration when structuring the financing. Thus, the software program can be customized to emit a deal structure that matches dealer requested gross-profit on a deal rather than the "best deal" or greatest profit as described above with reference to FIG. 7. In this example, the dealer may be motivated to limit profit in order to avoid losing a customer who realizes that his down-payment and monthly-payment requests have been met but, for example, the loan-term is too high or the interest rate is too high. Depending upon the lender, sometimes loan-terms can be lowered at the cost of dealer-profit.

In yet another embodiment, limits can be put on any output variable (e.g., Net Check to Dealer, Discount, Amount Financed, etc.) and the limited valued is used as an input value into the MVP program. The deal can then be optimized while taking into account the constraints put forth into the system.

Turning next to step 1014, the value of T is incremented, for example by one interval corresponding to a term length of T+1. Alternatively, if the financing loan-term is only valid in 3 or 6 month increments, then T can be increased by 3 or 6, respectively. At step 1016, the new value of T is compared to a maximum permitted value of T. Generally, the maximum value permitted for T is, for example, 102, indicating the loan will be paid off after 6 years. However, the maximum value for T can be changed depending upon the credit score, loan amount or other variables or alternatively can be limited by as an input value (such as described above). If the value of T is less than or equal to the maximum value for T, the process returns to step 1004, where steps 1004 through 1016 are repeated with the new, larger value of T. In an alternative embodiment, for the methods described in FIGS. 7 and 10, T can be initialized to a maximum value of T in step 1003 (step 703 for FIG. 7) and then reduced at step 1014 (step 7014 for FIG. 7). Steps 1004 through 1016 are then repeated where at step 1016, if T is less than the minimal T allowed, the process will continue at step 1018.

At step 1018, the MVP™ function determines whether any terms are stored. If none are stored, no combination of terms met the approval process discussed above within the constraints put forth by the customer and/or dealer for that particular vehicle/car. If, however, there are stored terms, they reflect those terms that maximize the dealer profit while optionally taking into consideration other input constraints. These terms are considered the optimized solution for the dealer and the customer, and are selected to specify the terms of the deal, as indicated in step 1020. These are the terms that give the dealer the greatest profit on the vehicle while taking into constraints in addition to the down payment value and monthly payment value.

In this way, after iterating from the minimum to maximum value for T (or from the maximum value of T to the minimum value of T), the terms that maximize the dealer profit for a given vehicle are always identified and selected while also taking into consideration other input variables that may have constraints. It is important to note that in one embodiment, however, since the financial services fee is determined based on the cost of the vehicle and/or the amount financed, merely having the highest possible vehicle sale price does not guarantee the highest possible dealer profit. Thus, a dealer who did not have access to the MVP™ function 312 described herein would likely have a very hard time attempting to structure a deal that provides the dealer with the greatest profit while taking into account other input constraints.

Additionally, as described herein, the "greatest profit" or "maximum profit" describes a value that is the largest value out of a plurality of values that are calculated using a finite number of term lengths T and optionally also taking into consideration other constraints variables. Generally, when structuring a loan, the T will be an integer number corresponding to a number of months of the term of a loan. Thus, the "greatest profit" or "maximum profit" may not be the absolute maximum dollar amount that can be calculated using the above equations (or other suitable equations), but is the greatest value when taking into consideration the general constraints of a loan and other input constraint values. For example, the additional constraint values, as described above, may be a maximum loan-term length the buyer is willing to pay, an expected dealer profit value, loan interest rate or other input variables. As described above, these variables may need to be set in order to prevent the customer from walking away from the deal.

The specific equations described herein are exemplary and other equations used to maximize a dealer's profit may be used in alternative embodiments. Additionally, the embodiments described herein with reference to FIGS. 2-9 may be implemented using a computer that includes a central processing unit such as a microprocessor, and a number of other units interconnected, for example, via a system bus. Such a computer may also include, for example, a Random Access Memory (RAM), Read Only Memory (ROM), an I/O adapter for connecting peripheral devices such as, for example, disk storage units and printers to the bus, a user interface adapter for connecting various user interface devices, a communication adapter for connecting the computer to a communication network (e.g., a data processing network) and a display adapter for connecting the bus to a display device.

Additionally, the various embodiments may be implemented on one or more of the following exemplary devices including: a personal computer, a laptop, a tablet PC, a Personal Digital Assistant (PDA) and other electronic devices independent of the underlying operating system (e.g., Windows, Linux, MAC, etc.). Additionally, the various embodiments can be implemented using a distributed computing environment or a local computing environment. For example, the embodiment described herein can be implemented as a personal computer client software architecture as well as a web-based architecture. In this manner, the user interface can be, for example, an application interface for a software program that is running locally or on a remote computer. Alternatively, the user interface can be a browser based interface where the computations and method described herein are implemented on a remote computer and provided to a user through the browser application. In accordance with some embodiments, the various aspects described above may be implemented using computer programming or engineering techniques including computer software, firmware, hardware or any combination or subset thereof. Any resulting program, having computer-readable code means, may be embodied or provided within one or more computer-readable media, thereby making a computer program product, i.e., an article of manufacture, according to the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network. In addition, one of ordinary skill in the art of computer science will be able to combine the software created as described with appropriate general purpose or special purpose computer hardware, Personal Digital Assistant (PDA)

hardware, or other electronic hardware to create a computer system or computer sub-system embodying the various methods of the invention.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

We claim:

1. A computer-implemented process for determining a structure for financing a purchase of a consumer product, comprising:
   a. optimizing, using a computer seller profit from a financed sale of one of a plurality of like consumer products based on a plurality of data inputs that, comprise a first data input that is a seller's cost value for the consumer product to be sold from among the plurality of like consumer products, a second data input that is a consumer-defined monthly payment value, a third data input that is a consumer-defined down payment value, and a fourth data input that is selected from a plurality of loan-term lengths;
   b. based upon the first, second, third, and fourth data inputs, calculating, using the computer the consumer product to be sold a plurality of financial structures at least one of which includes a vehicle purchase price calculated from at least the third data input and an amount financed value calculated using the following equation:

$A = FP \times [1 - \{1+(APR/12) - T\}]$, wherein "A" is the amount to be financed, "FP" is the second data input that is a consumer-defined monthly payment value, "APR" is an annual percentage rate, and "T" is loan-term length;
   c. determining, using the computer from the plurality of financial structures a financial structure that provides a greatest seller profit value; and
   d. outputting, using the computer one or more terms of the financial structure determined to provide the greatest seller profit value.

2. A method according to claim 1 further comprising outputting to a display device in electronic communication with the computer one or more terms of the financial structure determined to provide the greatest seller profit value.

3. A method according to claim 1 further comprising:
   d. calculating, using the computer for at least one other of the like consumer products a plurality of financial structures based on, as the first data input for the other like consumer product a seller's cost for that consumer product, and the second and third data inputs, and optionally the fourth data input; and
   e. for each of the like consumer products for which a plurality of financial structures have been determined, determining, using the computer from the plurality of financial structures for each like consumer product a financial structure that provides a greatest seller profit value for each of the plurality of like consumer products.

4. A method according to claim 3 further comprising determining from the greatest seller profit value for each of the like consumer products so as to provides a maximum profit value.

5. A method according to claim 3 further comprising outputting to a display device in electronic communication with the computer a list showing for each of the plurality of like consumer products the greatest seller profit determined for each of the like consumer products.

6. A method according to claim 1 wherein the like consumer products are used automobiles.

7. A method according to claim 6 that further comprises inputting as an additional data input at least one of data input selected from the group consisting of a trade-in allowance, trade-in payoff, document fee, license fee, smog fee, sales tax, warranty fee, warranty cost, financial service fee, finance acquisition fee, over-advance amount, maximum loan term, minimum loan term, consumer credit score, prior dealer profit, minimum dealer profit, and a list of the like consumer products.

8. A computer-implemented process for determining a structure for financing a purchase of a consumer product comprising:
   a. optimizing, using a computer seller profit from a financed sale of a consumer product based on a plurality of data inputs that include a first data input that is a seller's cost value for the consumer product, a second data input that is a consumer-defined monthly payment value, a third data input that is a consumer-defined down payment value, and a fourth data input that is selected from a plurality of loan-term lengths;
   b. based upon the first, second, and third data inputs and a first loan-term length value, determining, using the computer a first seller profit value from calculating a first financial structure for sale of the consumer product that includes a vehicle purchase price calculated from at least the third data input and an amount financed value calculated using the following equation:

$A = FP \times [1 - \{1+(APR/12) - T\}]$, where "A" is an amount to be financed, "FP" is the second data input that is a consumer-defined monthly payment value, "APR" is a first annual percentage rate, and "T" is a first loan-term length; and
   c. based upon the first, second, and third data inputs and a second loan-term length value, determining, using the computer a second seller profit value from calculating a second financial structure for sale of the consumer product that includes a vehicle purchase price calculated from at least the third data input and an amount financed value calculated using the following equation:

$A = FP \times [1 - \{1+(APR/12) - T\}]$, where "A" is the amount to be financed, "FP" is the second data input that is a consumer-defined monthly payment value, "APR" is a second annual percentage rate that can be equivalent to or different from the first annual percentage rate, and "T" is a second loan-term length that is different from the first loan-term length;
   and optionally determining via the computer the greater of the first and second seller profit values.

9. A method according to claim 8 further comprising executing, using the computer based upon the first, second, and third data inputs and a third loan-term length value that differs from at least one of the first and second loan-term lengths, determining, using a computer a third seller profit value from calculating a third financial structure for sale of the consumer product, and optionally determining via the computer the greater of the first, second, and third seller profit values.

10. A method according to claim 8 further comprising indicating the financial structure that corresponds to the greatest of the plurality of seller profit values.

11. A method according to claim 8 further comprising calculating a plurality of amount financed values based upon at least the consumer-defined monthly payment value for each of the plurality of loan-term lengths.

12. A method according to claim 8 further comprising outputting the greater of the first and second seller profit values.

13. A method according to claim 8 further comprising outputting to a display device in electronic communication with the computer one or more terms of the financial structure determined to provide the greatest seller profit value.

14. A method according to claim 11 further comprising, based upon at least the amount financed value and the consumer-defined down payment value, calculating for each loan-term length a vehicle purchase price calculated using the following equation:

$$P=A-DP+(\text{Trade-In Allowance})-(\text{Document-Fees})-(\text{Smog-Fees})-(\text{Sales Taxes})-(\text{Warranty-Amount})-(\text{License-Fees})-(\text{Trade-Payoff})-(\text{Insurance-Amounts})-(\text{Miscellaneous}),$$

where "P" is the purchase price, "A" is the amount to be financed, and "DP" is a down payment amount.

15. A method according to claim 14 wherein a seller profit value is calculated using the following equation:

$$(\text{Dealer-Profit})=(\text{Vehicle-Sale-Price})-(\text{Vehicle-Purchase-Price})-(\text{Financial-Services-Fee})-(\text{Acquisition Fee})+(\text{Document-Fees})+(\text{Warranty Amount})-(\text{WarrantyCost})-(\text{OverAdvance Amount}).$$

* * * * *

UNITED STATES PATENT AND TRADEMARK OFFICE
CERTIFICATE OF CORRECTION

PATENT NO. : 8,069,112 B2
APPLICATION NO. : 11/627846
DATED : November 29, 2011
INVENTOR(S) : Don Rufus Hankey and Amarpal Singh It is certified that error appears in the above-identified patent and that said Letters Patent is hereby corrected as shown below:

In the Specifications

Col. 8, line 60
Delete "$A=FP* 12/APR*[1-\{1+APR/12\}^{\wedge}(-T)]$" and insert -- $A= FP*[1-\{1 + (APR/12)\}-T]$ --

Col. 12, line 4
Delete "$A=FP* 12/APR*[1-\{1+APR/12\}^{\wedge}(-T)]$" and insert -- $A= FP*[1-\{1 + (APR/12)\}-T]$ --

Signed and Sealed this
Twenty-eighth Day of January, 2014

Michelle K. Lee
*Deputy Director of the United States Patent and Trademark Office*

UNITED STATES PATENT AND TRADEMARK OFFICE
CERTIFICATE OF CORRECTION

PATENT NO.        : 8,069,112 B2                                       Page 1 of 1
APPLICATION NO.   : 11/627846
DATED             : November 29, 2011
INVENTOR(S)       : Don Rufus Hankey and Amarpal Singh It is certified that error appears in the above-identified patent and that said Letters Patent is hereby corrected as shown below:

In the Specifications

Col. 8, line 60
Delete "$A=FP*[1-\{1 + (APR/12)\}-T]$" AND INSERT -- $A=FP*12/APR*[1-\{1+APR/12\}\wedge(-T)]$ --

Col. 12, line 4
Delete "$A=FP*[1-\{1 + (APR/12)\}-T]$" AND INSERT -- $A=FP*12/APR*[1-\{1+APR/12\}\wedge(-T)]$ --

In the Claims

Col. 15, line 32 (Claim 1)
Delete "$A=FP*[1-\{1 + (APR/12)\}-T]$" AND INSERT -- $A=FP*12/APR*[1-\{1+APR/12\}\wedge(-T)]$ --

Col. 16, line 32 (Claim 8)
Delete "$A=FP*[1-\{1 + (APR/12)\}-T]$" AND INSERT -- $A=FP*12/APR*[1-\{1+APR/12\}\wedge(-T)]$ --

Col. 16, line 45 (Claim 8)
Delete "$A=FP*[1-\{1 + (APR/12)\}-T]$" AND INSERT -- $A=FP*12/APR*[1-\{1+APR/12\}\wedge(-T)]$ --

This certificate supersedes the Certificate of Correction issued January 18, 2014.

Signed and Sealed this
Twenty-fifth Day of March, 2014

Michelle K. Lee
*Deputy Director of the United States Patent and Trademark Office*